June 2, 1964          F. T. PISANO          3,135,906

SPEED CONTROL SYSTEM FOR ELECTRIC MOTOR

Filed May 24, 1962

INVENTOR.
FRANK T. PISANO
BY
S. J. Rotondi, A. D. Dupont & S. Dubroff
ATTORNEYS.

United States Patent Office 3,135,906
Patented June 2, 1964

3,135,906
SPEED CONTROL SYSTEM FOR
ELECTRIC MOTOR
Frank T. Pisano, Philadelphia, Pa., assignor to the United States of America as represented by the Secretary of the Army
Filed May 24, 1962, Ser. No. 197,550
3 Claims. (Cl. 318—325)
(Granted under Title 35, U.S. Code (1952), sec. 266)

The invention described herein may be manufactured and used by or for the Government for governmental purposes without the payment to me of any royalty thereon.

This invention relates to systems such as are utilized to control the speed of a reversible direct current series wound motor coupled to a load device which is driven by the motor during one cycle of its operation and applies torque to the motor during another cycle of its operation. Such a load is encountered in various forms, one form being as the canopy of an aircraft. As is well known, such a canopy has to be raised against the force of gravity and exerts a driving force during its closure.

When a direct current series motor is utilized to raise and lower such a load device, the problem of preventing over-heating and excessive speed of the motor is encountered. This problem was solved by utilizing a first field winding of the motor to raise the load and utilizing a second field winding of the motor to lower the load, the first field winding being utilized to produce a breaking action during the lowering of the load.

How this is accomplished will be better understood from the following description when considered in connection with the accompanying drawings and its scope is indicated by the appended claims.

Referring to the drawings.

Figure 1:
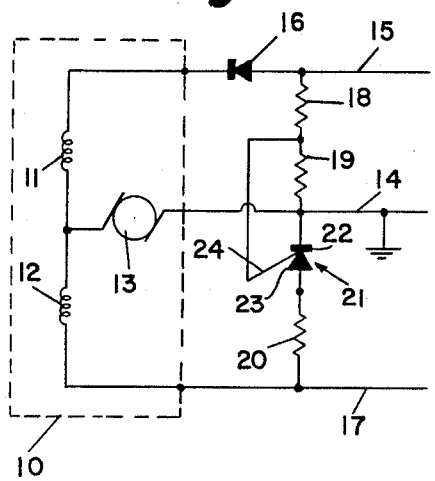
FIG. 1 is a wiring diagram of the system.

The system of FIG. 1 includes a motor 10 which has a pair of oppositely wound field windings 11 and 12 and an armature 13. One terminal of the armature 13 is connected to the field windings 11 and 12, and the other terminal of the armature is connected to a common lead 14 which is grounded. A lead 15 is connected to the field winding 11 through a diode 16, and a lead 17 is connected directly to the field winding 12. A voltage divider 18—19 is connected between the leads 14 and 15. A resistor 20 and a controlled rectifier 21 are connected in series between the leads 14 and 17.

The controlled rectifier 21 functions as a switch to open and close the connection between the leads 14 and 17 through the resistor 20. It includes a base 22, and emitter 23 and a collector 24, which is connected to the voltage divider 18—19 for a purpose hereinafter explained. It may be a "Silicon Controlled Rectifier," Type C35F manufactured by General Electric Co.

As is well understood, the motor 10 rotates in one direction when the field winding 11 is energized and in the opposite direction when the field winding 12 is energized. In normal use, the two field windings are never energized simultaneously. This is so for the reason that their magnetic fluxes would cancel, a destructive current would flow through them, and little or no current would enter the armature because of its high resistance as compared to that of the field windings. Under these conditions, the motor will not rotate and the field windings will be burned out.

In the operation of the system of FIG. 1, the field winding 12 is energized to raise the load, the field winding 11 is energized to lower the load, and the field winding 12 is energized during the lowering of the load in a manner to provide a braking action. How this braking action is accomplished will appear from the following considerations.

If the power source is connected between the terminals 14 and 15, the motor will rotate in a direction to lower the load. If these connections are retained and the lead 17 is connected to the lead 14, the motor will continue to run in the same direction but at a reduced speed. Under these conditions, the running current of the motor is increased because the field winding 12 is drawing current through the winding 11. The current in the winding 12 increases the magnetic field density of the motor. This increased field density retards the rotational speed of the motor thus functioning as a brake.

If the resistance 20 is introduced into the circuit of the field winding 12, the current is reduced and the speed of the motor is increased. The value of the resistor 20 is varied to obtain the best combination of speed and current under the particular working conditions involved.

When the power source is connected between the terminals 14 and 15 to lower the load as previously indicated the resistor 20 must be connected. This is accomplished automatically by the controlled rectifier 21 which has its base 22 and emitter 23 connected between the leads 14 and 17 in series with the resistor 20 and has its collector 24 connected to an intermediate point of the voltage divider. With these connections, the controlled rectifier conducts only when the leads 14 and 15 are connected to the source of power. When power is applied to the leads 14 and 17, a diode 16 blocks current from the voltage divider so that the controlled rectifier is rendered non-conductive.

Figure 2:
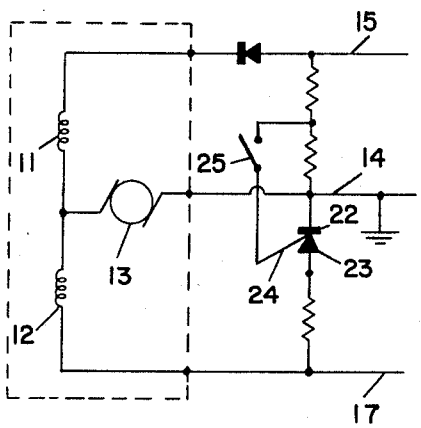
FIG. 2 is a similar diagram with the addition of a centrifugal switch which is sensitive to the motor speed.
Figure 4:
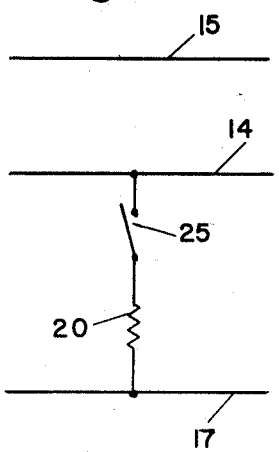
FIG. 4 illustrates a modification of one of the details of the system.

The system of FIG. 1 is well adapted to a situation where an aiding torque is constantly applied during one cycle of the load device's operation. A fluctuating torque produces undesirable variations in the speed of the motor. Some control of the motor's speed can be effected by allowing the field winding 12 to come into play only when the speed becomes excessive. In the arrangement of FIG. 2 this is accomplished by connecting in circuit with the collector 24 a switch 25 which closes when the motor attains a predetermined speed. Alternatively, the controlled rectifier may be omitted and the switch 25 connected as indicated by FIG. 4.

Figure 3:
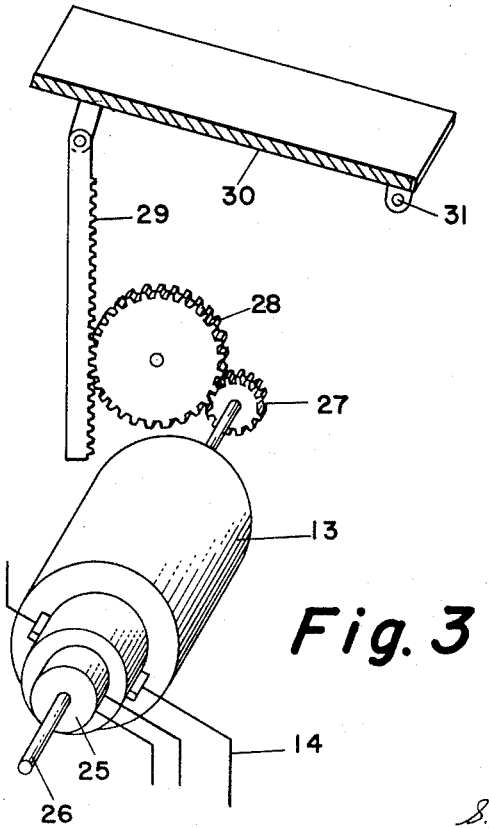
FIG. 3 is an indication of the general relation between the motor and the load.

FIG. 3 is intended to indicate in a general way the relation between the motor and other elements of the system. It shows the motor as having a shaft 26 on which are mounted the centrifugal switch 25 and a gear 27 which operates through a gear 28 and a rack 29 to raise and lower a canopy 30 pivoted at 31. It is apparent that the showing of the canopy is illustrative of various other kinds of load devices to which the invention may be applied, and that the gears 27 and 28 are illustrative of any suitable type of reducing gear.

I claim:
1. In a system for operating a load device which is driven during one cycle of its operation and generates driving torque during another cycle of its operation, the combination therewith of an electric motor having first and second oppositely wound field windings and an armature winding having one of its terminals connected to said field windings and the other of its terminals connected to a common input lead, separate input leads connected to said field windings, an asymmetric conductor connected in the input lead to said first field winding, circuit interrupting means and a resistor connected in series between said common lead and the input lead to the second of said field windings, a voltage divider connected between said common lead and the input lead to the first of said field windings, and means for applying from said voltage divider to said circuit interrupting means a voltage whereby current through said resistor is interrupted only when said first field winding is deenergized.

2. A system according to claim 1 wherein said circuit interrupting means is a silicon controlled rectifier.

3. A system according to claim 1 wherein the connection from said voltage divider to said circuit interrupting means includes a switch sensitive to the speed of said motor.

References Cited in the file of this patent
UNITED STATES PATENTS
2,356,166    Lee et al. _____ Aug. 22, 1944